United States Patent [19]

Idogaki et al.

[11] Patent Number: 4,600,871
[45] Date of Patent: Jul. 15, 1986

[54] MULTI-DIRECTIONAL DRIVE TYPE ELECTROMAGNETIC POSITION CONTROL APPARATUS

[75] Inventors: Takaharu Idogaki; Ikuo Hayashi, both of Okazaki; Hisasi Kawai, Toyohashi, all of Japan

[73] Assignee: Nippon Soken, Inc., Nishio, Japan

[21] Appl. No.: 706,861

[22] Filed: Feb. 28, 1985

[30] Foreign Application Priority Data

Mar. 2, 1984 [JP] Japan .................. 59-38818

[51] Int. Cl.$^4$ .............................................. G05B 1/06
[52] U.S. Cl. ............................. 318/653; 318/628; 335/229; 335/272; 310/156
[58] Field of Search ............. 318/653, 628; 310/156, 310/181; 335/229, 238, 266, 271, 272, 280, 276

[56] References Cited

U.S. PATENT DOCUMENTS

| | | | |
|---|---|---|---|
| 3,434,082 | 3/1969 | Montagu | 335/229 |
| 4,275,371 | 6/1981 | Vogel | 335/229 X |
| 4,342,951 | 8/1982 | Muller et al. | 318/628 |
| 4,445,061 | 4/1984 | Jackson, Jr. | 310/156 |
| 4,491,815 | 1/1985 | Idogaki et al. | 335/229 |
| 4,516,062 | 5/1985 | Fiandra et al. | 318/653 X |
| 4,533,847 | 8/1985 | Idogaki et al. | 310/156 X |

Primary Examiner—B. Dobeck
Attorney, Agent, or Firm—Cushman, Darby & Cushman

[57] ABSTRACT

An electromagnetic position control apparatus including a rotary sphere having a permanent magnet. The rotary sphere is rotably supported within a spherical hole formed at a crossing portion of a cross-shaped yoke. Coils are used to create magnetic fields at the rotary sphere. The position of rotation of the rotary sphere is controlled in three dimensions by means of changing the intensity of the direct current supplied to the coils or the duty cycle of the pulse current supplied to the coils to change the intensity of the magnetic fields.

13 Claims, 14 Drawing Figures

MULTI-DIRECTIONAL DRIVE TYPE ELECTROMAGNETIC POSITION CONTROL APPARATUS

BACKGROUND OF THE INVENTION

1. Field of the Invention

The present invention relates to a multi-directional drive type electromagnetic position control apparatus suitable for use as a three-dimensional position control apparatus for a remote-controlled mirror of an automobile or as an indicator such as an inclinometer.

2. Description of the Related Art

A conventional three-dimensional position control apparatus for a remote-controlled mirror for an automobile includes a reversible motor, an electromagnetic clutch for switching in the horizontal and vertical directions, and a gearing. The structure of such an apparatus is therefore very complicated.

A conventional inclinometer or other such indicator displays the inclination by dividing the inclination into vertical and horizontal components and showing those vertical and horizontal components as rotations on a plane surface. As a result, such indicators are difficult to read at a glance.

SUMMARY OF THE INVENTION

Accordingly, it is an object of the present invention to provide a position control apparatus which can control the position of rotation of a rotary sphere having a permanent magnet by means of a magnetic field generating means so as to achieve three-dimensional position control by a relatively simply structure.

According to the present invention, there is provided a multi-directional drive type electromagnetic position control apparatus including a rotary sphere containing a permanent magnet; a cross-shaped yoke made of a ferromagnetic substance; support means for supporting the rotary sphere in a rotatable state at the crossing portion of the cross-shaped yoke; and magnetic field generating means for generating a magnetic field at the crossing portion of the cross-shaped yoke; the rotational position of said rotary sphere being controlled to a position where the torque resulting from the combination of a stabilization force due to the permanent magnet in said rotary sphere and a force exerted on the rotary sphere due to the magnetic field generated by the magnetic field generating means is zero, said rotary sphere being stabilized at a predetermined rotational position by receiving the stabilization force even when no magnetic field is generated by the magnetic field generating means.

BRIEF DESCRIPTION OF THE DRAWINGS

Examples of an apparatus in accordance with the present invention will now be described with reference to the accompanying drawings, in which.

DESCRIPTION OF THE PREFERRED EMBODIMENTS

Figure 1:
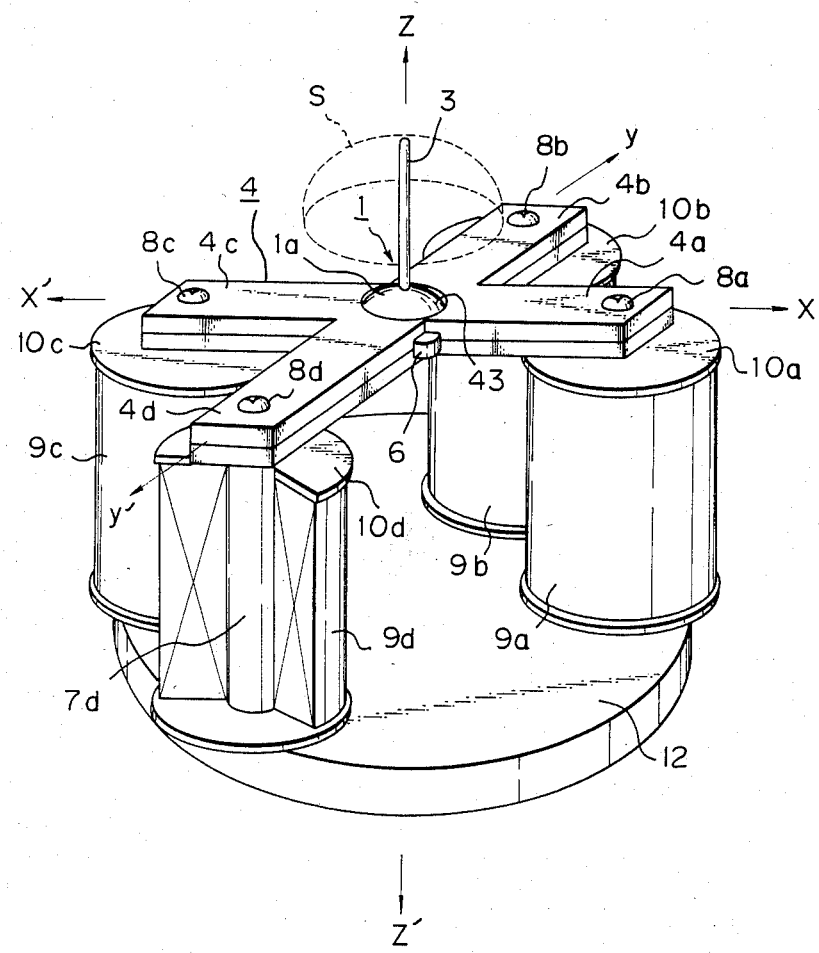
FIG. 1 is a perspective view of an electromagnetic position control apparatus as one embodiment of the present invention.
Figure 2:
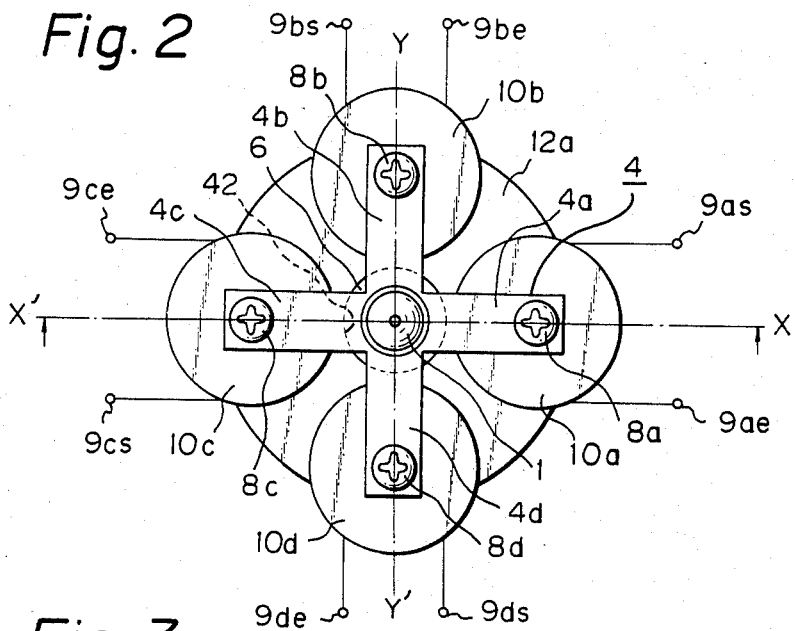
FIG. 2 is a plan view of the apparatus shown in FIG. 1.

In FIG. 1 is shown perspectively an electromagnetic position control apparatus according to one embodiment of the invention. In FIG. 2 is shown a plan view of the apparatus of FIG. 1, and in FIG. 3 a sectional view taken along a line X—X' of FIG. 2.

Figure 3:
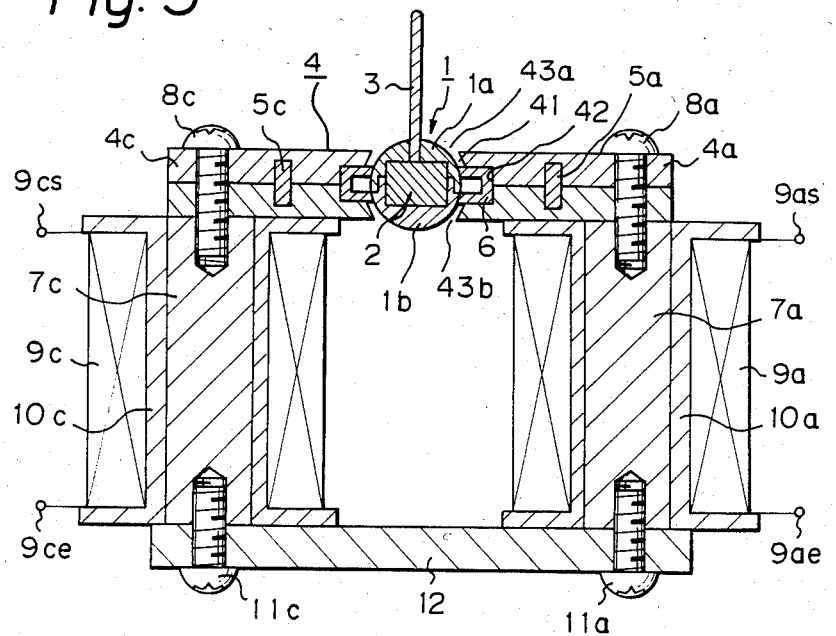
FIG. 3 is a sectional view taken along the line X—X' of FIG. 2.

In FIGS. 1, 2, and 3, a movable sphere or rotary sphere 1 is formed by coupling hemispheres 1a and 1b made of a nonmagnetic substance, for example, stainless steel. A cylindrical chamber is formed inside the rotary sphere 1. Into this cylindrical chamber, a cylindrical permanent magnet 2 magnetized in the direction of the cylinder axis is fit. Furthermore, an output bar 3 is fixed to the rotary sphere 1.

A spherical hole 41 having a spherical inside surface is formed in the center of a cross-shaped yoke 4 of a ferromagnetic substance. Inside of the spherical hole 41, the rotary sphere 1 is rotably supported. The yoke 4 has four arm portions 4a, 4b, 4c, and 4d, it consists of two cross-shaped iron yokes placed one upon another and positioned by means of four knock pins 5a, 5b, 5c, and 5d. The spherical hole 41 containing the rotary sphere 1 opens at the upper and lower sides of the cross-shaped yoke 4 through the apertures 43a and 43b. The output bar 3 protrudes from the aperture 43a.

In the outer portion of the spherical hole 41 of the cross-shaped yoke 4, a cylindrical hole 42 which has a diameter larger than the diameter of the spherical hole 41 is formed. Into this cylindrical hole 42, a bearing ring 6 of polytetrafluoroethylene having a U-shaped cross-section is embedded. The bearing ring 6 is in linear contact with the surface of the rotary sphere 1 within the spherical hole 41 at the top portion of U-shaped cross-section. Therefore, the rotary sphere 1 has a constant clearance between its outside surface and the inside surface of the spherical hole 41 and is supported to rotate around a fixed point in any direction.

Coils 9a to 9d, iron side yokes 7a to 7d, and bottom yoke 12 are provided as magnetic field generating means. The side yokes 7a to 7d are fixed to the arm portions 4a to 4d of the cross-shaped yoke 4 by means of screws 8a to 8d, respectively. Plastic coil bobbins 10a to 10d, to which coils 9a to 9d are wound, are respectively embedded in these side yokes 7a to 7d. The side yokes 7a to 7d are also fixed to an iron bottom yoke 12 by means of screws 11a to 11d, respectively.

The coils 9a to 9d have winding starts 9as to 9ds and winding ends 9ae to 9de, respectively. The coils 9a and 9c and the coils 9b and 9d are connected in series, respectively. Therefore, the coils 9a and 9c, when energized, create a magnetic flux inside of the cross-shaped yoke 4 in the direction of the X axis along the line X—X' of FIG. 2. The coils 9b and 9d, when energized, create a magnetic flux in the direction of the Y axis along the line Y—Y'. The magnetic flux in the X-axial direction and that in the Y-axial direction intersect at the spherical hole 41.

Figure 4:
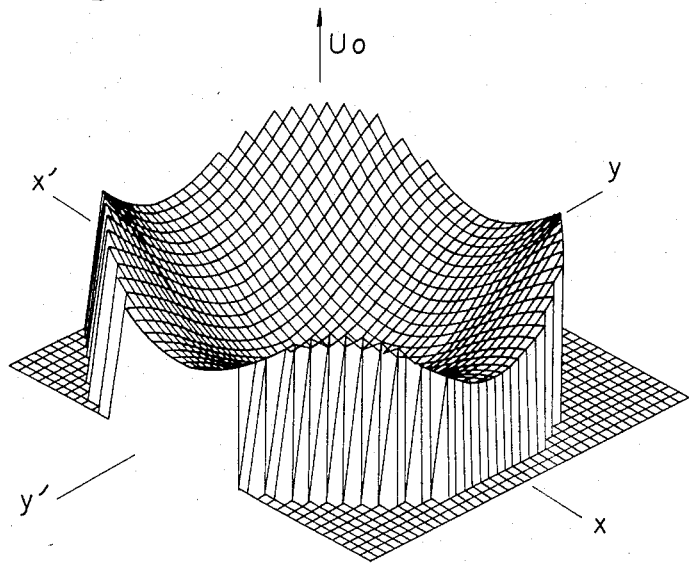
FIG. 4 is a graphic view of the distribution of potential energy of a rotary sphere of the apparatus shown in FIGS. 1 to 3.

The mode of operation of the position control apparatus of FIG. 1 will now be described referring to FIGS. 4, 5, and 6. In that position control apparatus, when coils 9a to 9d are not energized, the rotary sphere 1 is stabilized at the position where the polar direction of the permanent magnet 2 coincides with the Z axis along a line Z—Z'.

That is, when the coils are not energized, the rotary sphere 1 is stabilized at the position of smallest reluctance with respect to the permanent magnet 2, in other words, the position of minimum potential energy $U_0$. The position control apparatus of FIG. 1 has two main magnetic flux paths with the permanent magnet 2; path A through the cross-shaped yoke 4, side yokes 7a to 7d, and bottom yoke 12 and path B from the upper to lower side of the cross-shaped yoke 4 along the outside portion of the cylindrical hole 42.

Selection of an appropriate diameter and height of the cylindrical hole 42 enables a smaller reluctance of the path B than path A. Considering the direction of the yokes 4a to 4c as the X axis and the direction of the yokes 4b to 4c as the Y axis, the cross-sections taken along the line X—X' and the line Y—Y' are symmetrical. Thus, the permanent magnet 2 is stabilized at the position where the polar direction of the permanent magnet 2 coincides with the Z-axial direction, which intersect the X and Y axes at right angles.

In this way, when coils 9a to 9d are not energized, a magnetic spring force is exerted on the rotary sphere 1 in a direction causing the permanent magnet 2 to coincide in the polar direction with the Z axis. The X-axial component T(XO) of this magnetic spring force may be expressed as follows:

$$T(XO) = \alpha \cdot M \cdot \sin 2\theta \tag{1}$$

where M is a magnetic moment of the permanent magnet 2, $\theta$ is an angle between the magnetic moment M and X axis, and $\alpha$ is a constant.

In the same way, the Y-axial component T(YO) of the magnetic spring force may be expressed as follows:

$$T(YO) = \alpha \cdot M \cdot \sin 2\phi \tag{2}$$

where $\phi$ is an angle between the magnetic moment and Y axis.

The torque T(O) exerted on the permanent magnet 2 or rotary sphere 1 can be found by combining these components T(XO) and T(YO). The potential energy can be obtained by integrating this torque. Projecting the spherical space occupied by the rotary sphere 1 on an X-Y plane and taking the potential energy $U_0$ in the direction intersecting the X-Y plane at right angles, the distribution of the potential energy may be expressed as shown in FIG. 4. As clear from FIG. 4, the rotary sphere is stabilized at the center.

The control of the position of the rotary sphere 1 to any direction will now be described. A direct current is used to energize the coils 9a to 9d. The coils 9a and 9c are interconnected so that when energized they generate a magnetic flux in the same direction along the X axis in the cross-shaped yoke 4. In the same way, the coils 9b and 9d are interconnected so that they generate a magnetic flux in the same direction along the Y axis. The operation described below is that in the case where the coils 9b and 9d are energized.

When energized by a direct current $I_X$, the coils 9a and 9c create a main magnetic flux $\phi(Ix)$ passing through the side yoke 7a, arm portion 4a of the cross-shaped yoke 4, arm portion 4c, side yoke 7c, and bottom yoke 12. The magnetic field H(Ix) generated by this main magnetic flux $\phi(Ix)$ acts on the permanent magnet 2. The torque T(Ix) created on the magnetic moment M of the permanent magnet 2 by this magnetic field H(Ix) may be expressed as follows:

$$T(Ix) = M \cdot H(Ix) \cdot \sin \theta \tag{3}$$

As the magnetic field H(Ix) is proportional to the current Ix flowing through the coils, the above formula (3) may be transformed to the next formula (4):

$$T(Ix) = \beta \cdot M \cdot Ix \cdot \sin \theta \tag{4}$$

where $\beta$ is a constant.

Accordingly, a combined torque $T(\theta)$, consisting of the detent torque T(XO) of formula (1) generated between the permanent magnet 2 and the cross-shaped yoke 4 when not energized and the torque T(Ix) of formula (4) generated by the current Ix, is exerted on the permanent magnet 2. This combined torque $T(\theta)$ may be expressed as follows:

$$T(\theta) = \beta \cdot M \cdot Ix \cdot \sin \theta + \alpha \cdot M \cdot \sin 2\theta \tag{5}$$

Figure 5:
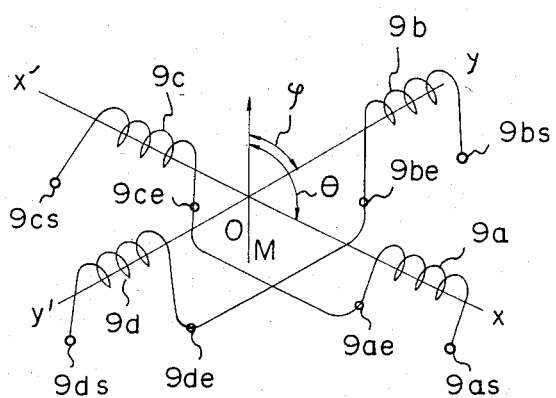
FIG. 5 is a view explaining the relationships of rotational angles $\theta$ and $\phi$ of the rotary sphere of the apparatus shown in FIGS. 1 to 3.

FIG. 5 shows the relationship of angles $\theta$ or $\phi$ lying between the X or Y axes and the magnetic moment M. The origin of angles $\theta$ and $\phi$ is set as the position where the north pole of the permanent magnet and the north pole generated on the spherical surface of the cross-shaped yoke facing the rotary sphere 1 when energized face each other.

The torque is considered positive in the rotational direction, i.e., the direction of increase of the angles $\theta$ or $\phi$. Therefore, a positive torque means an increase on the rotational angle and a negative torque means a decrease in the rotational angle. When the coils are not energized, the magnetic spring force results in the permanent magnet 2 facing the Z-axial direction in its polar direction, so that the angles $\theta$ and $\phi$ are both 90°.

Figure 6:
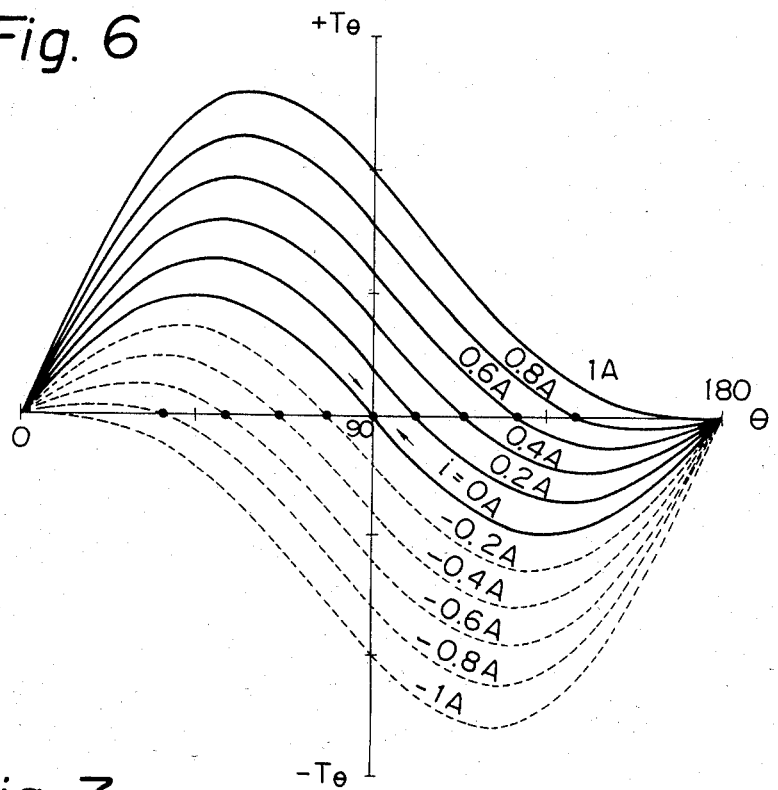
FIG. 6 shows characteristic curves of the combined torque $T(\theta)$ with respect to the rotational angle $\theta$ of the rotary sphere of the apparatus shown in FIGS. 1 to 3.

In FIG. 6 is shown the characteristic curve of the combined torque $T(\theta)$, using the current Ix as a parameter. The ordinate represents the combined torque $T(\theta)$, and the abscissa represents the angle $\theta$. The torque curves corresponding to each current value are almost sinusoidal in form and intersect with the abscissa, i.e., $T(\theta) = 0$. Since the permanent magnet 2 is stabilized at the position where the combined torque $T(\theta)$ is zero, the permanent magnet 2 is stably held with respect to each current Ix at the angle $\theta$ corresponding to intersections (black round points) of each torque curve in FIG. 6 with the line $T(\theta) = 0$. Accordingly, the rotational angle $\theta$ may be changed by changing the current Ix.

In the case described above, as the coils 9b and 9d are not energized, the torque of the φ direction is the detent torque T(YO) represented by formula (2). When the coils 9b and 9d are energized by a direct current Iy, the combined torque T(φ) with respect to the angle φ is generated in the same manner as described above. This combined torque T(φ) may be expressed as follows:

$$T(\phi) = \beta \cdot M \cdot I_y \cdot \sin \phi + \alpha \cdot M \cdot \sin 2\phi \quad (6)$$

Consequently, the combined torque of T(θ) and T(φ) acts on the rotary sphere 1. Accordingly, the combination of the current Ix flowing through the coils 9a and 9c and the current Iy flowing through the coils 9b and 9d determines the rotational angles θ and φ and, accordingly, the stable position of the rotary sphere 1. Thus, the apparatus of present invention can control the position of the rotary sphere 1 in three dimensions by means of a single drive device.

Although a preferred embodiment has been described heretofore, various modifications and alterations of the embodiment are possible within the scope of the present invention. Such modifications and alterations relate to the means to supply the current to the coils, means to support the rotary sphere in the rotative state, means for stabilizing the rotary sphere to hold it at a predetermined stable position when the coils are not energized, and so on. These modifications will be described below.

Figure 7:
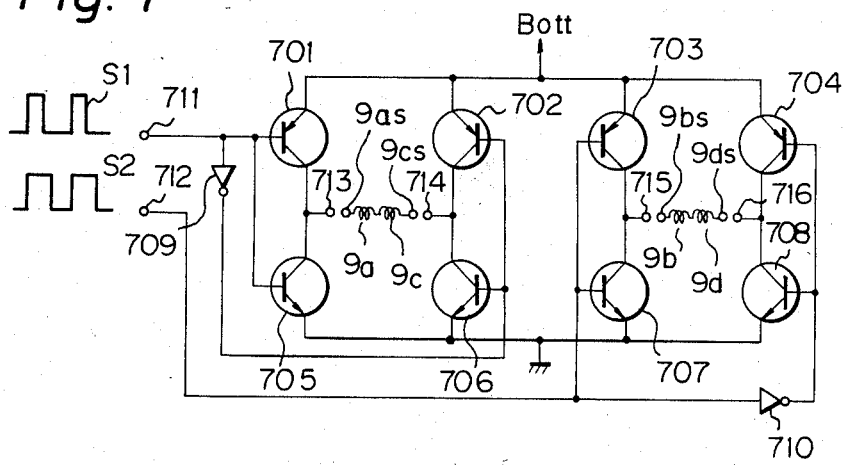
FIG. 7 is a diagram of a modified circuit for energizing coils in the apparatus shown in FIGS. 1 to 3.

First, a modification will be described with reference to FIG. 7. In the apparatus shown in FIG. 1, a direct current was passed through the coils 9a to 9d. In the circuit shown in FIG. 7, a pulse current is used instead of the direct current. The hysteresis of positioning is decreased due to the pulse current, and the position of the rotary sphere is controlled by changing the duty cycle of the pulse current. In FIG. 7, the control circuit includes PNP transistors 701, 702, 703, and 704; NPN transistors 705, 706, 707, and 708; inverters 709 and 710; input terminals 711 and 712; and output terminals 713, 714, 715, and 716. The transistor pairs 701 and 705, 702 and 706, 703 and 707, and 704 and 708 are respectively connected in series by connecting their collectors. Each transistor pair is connected between the power source and ground. The output terminals 713, 714, 715, and 716 are respectively connected to points where the collectors are commonly connected. The input terminal 711 is connected to the bases of the transistors 701 and 705 and also to the bases of the transistors 702 and 706 via the inverter 709. In the same way, the input terminal 712 is connected to the bases of the transistors 703 and 707 and also to the bases of the transistors 704 and 708 via the inverter 710.

The series-connected coils 9a and 9b described above are connected between the output terminals 713 and 714, and the series-connected coils 9b and 9d are connected between the output terminals 715 and 716.

The operation of the position control apparatus using the control circuit of FIG. 7 will be described below. Independent input signals S1 and S2, with variable duty cycles, are respectively applied to the input terminals 711 and 712. When the input signal S1 is applied to the input terminal 711, if the input signal S1 is the "0" level, current flows from the power source to ground through the transistor 701, coils 9a and 9c, and transistor 706. If the input signal S1 is the "1" level, current flows through the transistor 702, coils 9c and 9a and transistor 705. Thus, the current flows through the coils 9a and 9c in the opposite direction as with the above case. When the input signal S2 is applied, the current flows through the coils 9b and 9d in the same manner as described above.

Accordingly, assuming that the frequencies of the input signals S1 and S2 are 200 Hz and the duty cycles are 50%, the mean currents flowing through the coils 9a and 9c and coils the 9b and 9c are zero. Therefore, the rotary sphere 1 is positioned at the same angle as when the coils are not energized. By changing independently the duty cycles of the input signals S1 and S2, the mean currents of the coils can be changed. Therefore the position of the rotary sphere 1 may be controlled to any angular position by the combination of input signals S1 and S2. Moreover, by setting the frequency of the input signals S1 and S2 to an appropriate value, the rotary sphere 1 may be placed in a moving friction state to reduce the hysteresis of positioning.

It is also possible to control the magnitude of the current flow in accordance with the rotational position of the rotary sphere as detected by means of, for example, a Hall device, for more precise position control.

Figure 8:
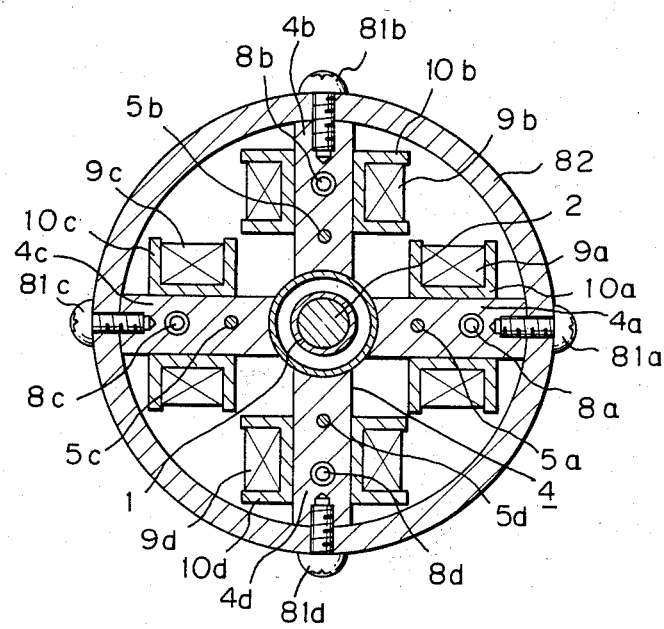
FIGS. 8, 9, and 10 are modified examples of coil means for generating a magnetic field in the position control apparatus according to the present invention.

Modifications of the coil means for generating the magnetic field will be described with reference to FIGS. 8, 9, and 10. In FIG. 8 is shown a transverse sectional view of a modification of the cross-shaped yoke 4. In this modification, four coils 9a to 9d are wound around four arm portions 4a to 4d instead of four side-yoke 8a to 8d. Also, a ring 82 is attached around the cross-shaped yoke 4 by means of screws 81a to 81d for providing a closed magnetic path.

In the above-described example, four coils 9a to 9d are used to generate magnetic fluxes in the X- and Y-axial directions. The number of coils is not always limited to four, however. For example, two coils 9a and 9b may be used to generate the magnetic fluxes.

Figure 9:
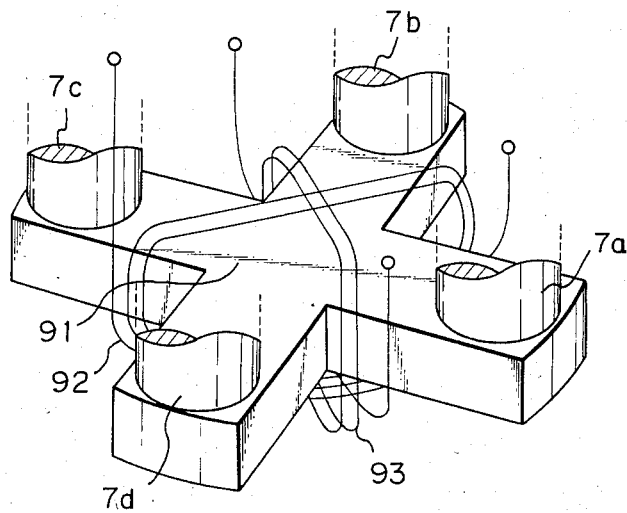

In FIG. 9 is shown another modification in which no coil bobbins are used. That is, in this modification, the bottom yoke is formed into a cross-shaped yoke 91. Two coils 92 and 93 are wound around the crossing portion of the yoke 91 so as to intersect at right angles.

Figure 10:
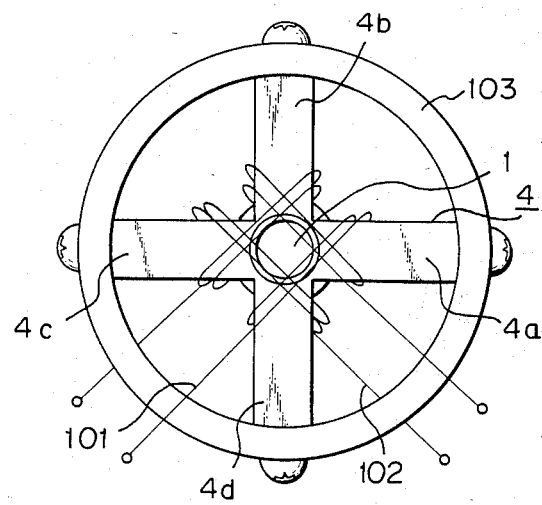

In FIG. 10 is shown a further modification in which two coils 101 and 102 are wound so as to intersect at right angles around the crossing portion of the cross-shaped yoke 4 in which the rotary sphere 1 is supported. In this modification, a ring 103 is also used for providing a closed magnetic path.

In this way, any means which can generate two or more independent magnetic fields at predetermined angles with respect to the rotary sphere may be utilized.

Figure 11:
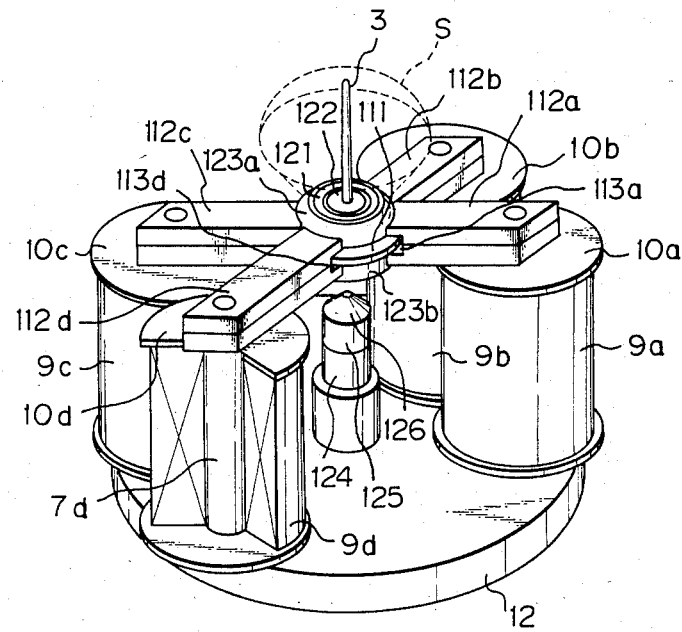
FIG. 11 is a perspective view of support means for a rotary sphere and means for providing stabilization force of the position control apparatus according to the present invention.

Modifications of the support means for the rotary sphere and stabilization force exertion means are described with reference to FIGS. 11 and 12: FIG. 11 being a perspective view of this modification and FIG. 12 being an exploded view of the rotary sphere support means of this modification.

Figure 12:
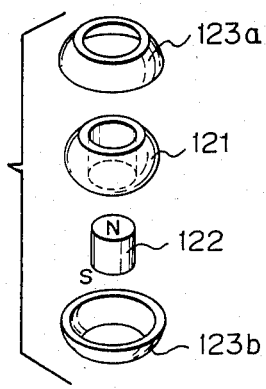
FIG. 12 is an exploded view of the support means for the rotary sphere of the apparatus shown in FIG. 12.

In this modification, as shown in FIG. 12, the support means for the rotary sphere is constituted as follows. A cylindrically shaped hole portion is formed in a rotary sphere 121 made of a nonmagnetic substance having a low coefficient of friction. A cylindrically shaped permanent magnet 122 is fit into this cylindrically shaped hole portion. An output bar 3 is attached to that permanent magnet 122. The rotary sphere 121 is rotably held through contact of its upper side and lower side with two spherical shell pieces 123a and 123b. The spherical shell pieces 123a and 123b are fixed to yoke pieces 112a to 112d, having between them a ring-shaped gap member 111 made of non-magnetic substance. Alternatively, the spherical shell pieces 123a and 123b may be formed integrally with the yoke pieces 112a to 112d.

The yoke pieces 112a to 112d have gap portions 113a to 113d. The side yokes 7a to 7d, coils 9a to 9d, coil bobbins 10a to 10d, and bottom yoke 12 have the same constitution as in FIG. 1. On the center of the bottom yoke 12, are fixed, one upon another, a center yoke 124 having a screw thread around its outer wall, a fixed permanent magnet 125, and a pole piece 126.

In the position control apparatus of FIG. 11, when the coils 9a to 9d are not energized, the rotary sphere 121 is stably held due to the restoring force generated by the magnetic attraction of the permanent magnet 125 and the magnetic spring force produced by the yoke pieces 112a to 112d and gap member 111, as described in FIG. 1. When the coils 9a and 9c are energized, the magnetic field is generated in the direction of the yoke pieces 112a–112c, i.e., the X axis. When the coils 9b and 9d are energized, the magnetic field is generated in the direction of the yoke pieces 112b–112d, i.e., the Y axis. Thus, the permanent magnet 122, and thus the rotary sphere 121, are subjected to a torque generated by the combined magnetic field. Consequently, the rotary sphere 121 rests at the position where the torque and the above-described restoring force are in equilibrium. Thereby, the output bar 3 may be controlled to any position in the space shown by the dashed lines S. In the apparatus of FIG. 11, the position of the rotary sphere 121 can be controlled by feedback control by positioning at least two Hall devices around the fixed permanent magnet 125.

Figure 14:
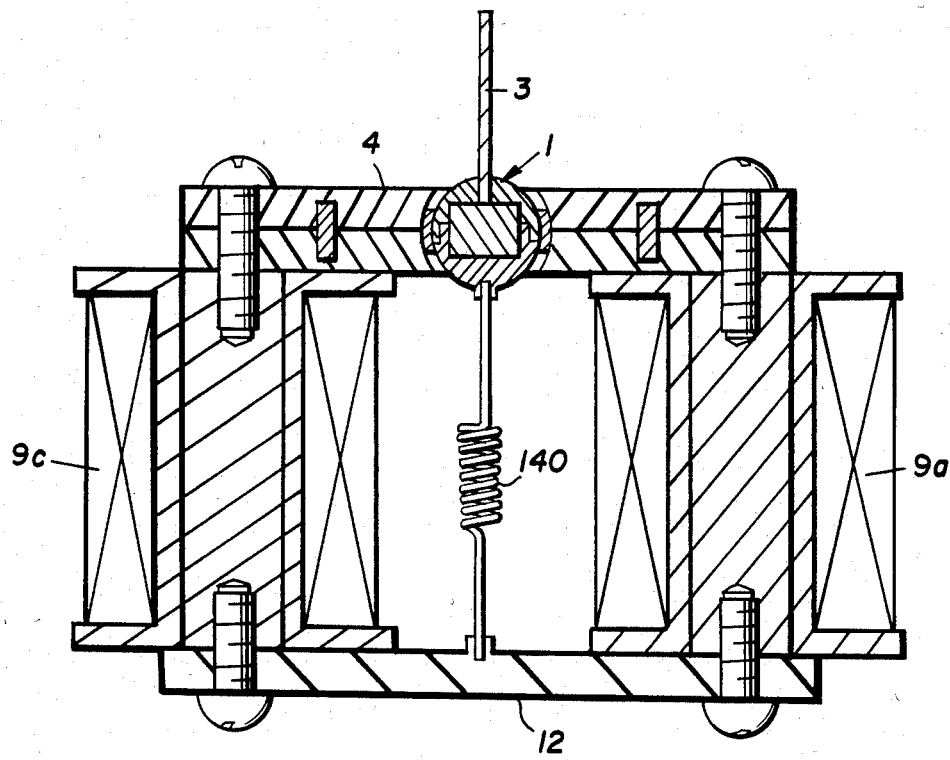
FIG. 14 is a sectional view similar to FIG. 3 showing a spring type variant for exerting stabilization force.

Various means for exerting the stabilization force can be used instead of the above-described embodiments. For example, mechanical spring means such as a fine spring 140 which pulls the rotary sphere downward in FIG. 14 can be utilized. Also, it is possible to utilize the mechanical friction obtained by a viscous material such as high viscosity silicone oil or grease filled in the clearance around the rotary sphere for stabilizing the rotary sphere. In this case, this force of mechanical friction should be selected to be smaller than the torque exerted on the rotary sphere. In the case of this modification, since the restoring force which returns the rotary sphere to a predetermined position is not utilized, the duration of energization of the coils is changed in order to control the position of the rotary sphere to the desired angular position instead of utilizing the equilibrium between the restoring force and the combined torque.

Various uses of the electromagnetic position control apparatus according to the present invention will now be explained. The apparatus may, for example, be used for remote control of an automobile mirror by attaching the mirror to an output bar 3.

Figure 13:
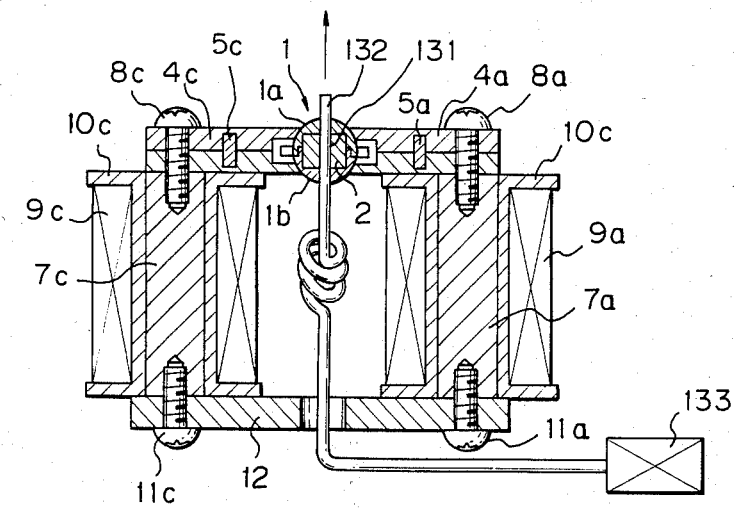
FIG. 13 shows the use of the position control apparatus of present invention.

In FIG. 13 is shown another use of the present invention. In FIG. 13, the rotary sphere 1 has an optical fiber 132 passing through the hole 131 instead of the output bar 3. Accordingly, it is possible to control the radiant direction of light output from light source 133 to any direction in a three-dimensional space.

In another use of the present invention, the output bar is eliminated and the rotary sphere 1 is given a plurality of small dimples on its surface like a golf ball. An external moving body with projections of diameters smaller than those of the dimples is provided at the outside of the aperture portion. The dimples of the rotary sphere 1 engage with projections of the external moving body to increase or decrease the rotation of the rotary sphere 1.

In a related use of the present invention, the apparatus may be used as a remote control device in a converse manner, specifically, the output bar is used as a control stick. In this case, the apparatus is equipped with Hall devices for sensing the position of rotation of the rotary sphere. The operator operates the output bar, i.e., control stick, to rotate the rotary sphere, the position of rotation of the rotary sphere is sensed by means of Hall devices, and a relevant system is controlled in accordance with this sensed position. In this regard, if the current applied to the coils is changed so as to correspond to the state of the controlled system, a variable repulsive force corresponding to the state of the controlled system may be exerted on the output bar. For example, in the case of a remote control device of a toy car, when the car bumps against a wall and cannot move forward, that state is sensed by sensing means and the coils of the remote control device are energized by a current corresponding to the sensed state. When the operator tries to push the output bar to the forward position, a repulsive force is exerted on the output bar, giving the operator the feel of the actual operation of the car.

We claim:

1. A multi-directional drive type electromagnetic position control apparatus comprising:
   a rotary sphere containing a permanent magnet;
   a cross-shaped yoke made of a ferromagnetic substance;
   support means for supporting the rotary sphere in a rotatable state at the crossing portion of the cross-shaped yoke; and
   magnetic field generating means for generating a magnetic field at the crossing portion of the cross-shaped yoke;
   the rotational position of said rotary sphere being controlled to a position where the torque resulting from the combination of a stabilization force due to the permanent magnet in said rotary sphere and a force exerted on the rotary sphere due to the magnetic field generated by the magnetic field generating means is zero;
   said rotary sphere being stabilized at a predetermined rotational position by receiving the stabilization force even when no magnetic field is generated by the magnetic field generating means.

2. An apparatus as claimed in claim 1, wherein the cross-shaped yoke has a hollow portion on its surface facing the rotary sphere, the stabilization force being generated due to the hollow portion.

3. An apparatus as claimed in claim 1, wherein the apparatus further comprises a fixed permanent magnet positioned around the rotary sphere, the stabilization force being generated due to the fixed permanent magnet.

4. An apparatus as claimed in claim 1, wherein the apparatus further comprises a mechanical spring pulling the rotary sphere in a predetermined direction, the stabilization force being generated due to the mechanical spring.

5. An apparatus as claimed in claim 1, wherein the apparatus further comprises a viscous material such as a high viscosity silicone oil or grease filled in clearances around the rotary sphere, the stabilization force being generated due to mechanical friction of the viscous material.

6. An apparatus as claimed in claim 1, wherein the support means comprises a ring bearing embedded in a spherical hole formed at the crossing portion of the cross-shaped yoke, rotably supporting the rotary sphere.

7. An apparatus as claimed in claim 1, wherein the support means comprises two hemisphere shells connected at the crossing portion of the cross-shaped yoke, rotably supporting the rotary sphere by surface contact.

8. An apparatus as claimed in claim 1, wherein the magnetic field generating means comprises side and bottom yokes, for forming a closed magnetic path with the cross-shaped yoke, and windings wound around the side yokes.

9. An apparatus as claimed in claim 1, wherein the magnetic field generating means comprises a ferromagnetic ring attached around the cross-shaped yoke, for forming a closed magnetic path with the cross-shaped yoke, and windings wound around arm portions of the cross-shaped yoke.

10. An apparatus as claimed in claim 1, wherein the magnetic field generating means comprises side and cross-shaped bottom yokes, for forming a closed magnetic path with the cross-shaped yoke, and two windings wound around the cross portion of the cross-shaped bottom yoke so as to intersect each other at right angles.

11. An apparatus as claimed in claim 1, wherein the magnetic field generating means comprises a ferromagnetic ring attached around the cross-shaped yoke, for forming a closed magnetic path with the cross-shaped yoke, and two windings wound around the cross portion of the cross-shaped yoke so as to intersect each other at right angles.

12. An apparatus as claimed in claim 8, wherein the current applied to the windings is a direct current.

13. An apparatus as claimed in claim 8, wherein the current applied to the windings is a pulse current whose duty cycle can be changed.

* * * * *